(12) United States Patent
Hamad

(10) Patent No.: US 9,371,755 B2
(45) Date of Patent: Jun. 21, 2016

(54) MEMBRANE SEPARATION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

(75) Inventor: Esam Zaki Hamad, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 13/980,620

(22) PCT Filed: Jan. 20, 2012

(86) PCT No.: PCT/US2012/022058
§ 371 (c)(1),
(2), (4) Date: Aug. 29, 2013

(87) PCT Pub. No.: WO2012/100182
PCT Pub. Date: Jul. 26, 2012

(65) Prior Publication Data
US 2013/0333354 A1    Dec. 19, 2013

Related U.S. Application Data

(60) Provisional application No. 61/434,677, filed on Jan. 20, 2011.

(51) Int. Cl.
*F01N 3/00* (2006.01)
*F01N 3/08* (2006.01)
(Continued)

(52) U.S. Cl.
CPC ............... *F01N 3/08* (2013.01); *B01D 53/002* (2013.01); *B01D 53/22* (2013.01); *B01D 53/343* (2013.01);
(Continued)

(58) Field of Classification Search
CPC .......... F01N 3/08; F01N 5/02; B01D 53/002; B01D 53/22; B01D 53/343; B01D 53/92; B01D 2257/504; F02B 37/00; Y02C 10/10
USPC .............. 60/39.55, 39.511, 274–324; 55/418; 454/254
See application file for complete search history.

(56) References Cited

U.S. PATENT DOCUMENTS 3,658,043 A    4/1972 Hoffman
3,828,552 A    8/1974 Nishiguchi
(Continued)

FOREIGN PATENT DOCUMENTS

CN    201196111 Y    2/2009
DE    3437750 A1    5/1986
(Continued)

OTHER PUBLICATIONS

Dubey et al., "Extraction of Carbon Dioxide From the Atmosphere Through Engineered Chemical Sinkage", Fuel Chem. Div. Preprints, 2002, 47(1), pp. 81-84.
(Continued)

*Primary Examiner* — Thomas Denion
*Assistant Examiner* — Kelsey Stanek
(74) *Attorney, Agent, or Firm* — Abelman, Frayne & Schwab

(57) ABSTRACT

A method and system are described for on-board treatment of an exhaust stream containing $CO_2$ emitted by a hydrocarbon-fueled internal combustion engine (ICE) used to power a vehicle in order to reduce the amount of $CO_2$ discharged into the atmosphere which include:

a. a first waste heat recovery zone on board the vehicle for receiving the high temperature exhaust gas stream,
  at least one heat exchanger having an inlet for receiving the hot exhaust gas stream from the ICE for passage in heat exchange relation and a discharge outlet for discharging the exhaust stream at a lower temperature, the heat recovery zone further including at least one heat recovery device for converting the waste heat from the exhaust gas to electrical and/or mechanical energy;
b. a membrane separation zone in fluid communication with the exhaust gas stream discharge outlet from the waste heat recovery zone, the membrane separation zone including a membrane module having a permeate side to which $CO_2$ permeates and a retentate side that is contacted by the cooled exhaust gas stream, the retentate side including a treated exhaust gas stream outlet;
c. a densification zone in fluid communication with the permeate side of the membrane molecule for receiving permeate $CO_2$, the densification zone including means for reducing the temperature and volume of the $CO_2$ to at least liquefy the $CO_2$, and to produce a treated exhaust gas stream of reduced $CO_2$ content;
d. a storage zone for receiving the densified $CO_2$ for temporary storage on board the vehicle; and
e. an exhaust gas conduit in fluid communication with the treated exhaust gas stream outlet from the membrane module zone.

16 Claims, 5 Drawing Sheets

(51) Int. Cl.
*B01D 53/22* (2006.01)
*B01D 53/34* (2006.01)
*B01D 53/92* (2006.01)
*F01N 5/02* (2006.01)
*B01D 53/00* (2006.01)
*F02B 37/00* (2006.01)

(52) U.S. Cl.
CPC ...... *B01D 53/92* (2013.01); *F01N 5/02* (2013.01); *B01D 2257/504* (2013.01); *F02B 37/00* (2013.01); *Y02C 10/10* (2013.01); *Y02T 10/16* (2013.01)

(56) References Cited

U.S. PATENT DOCUMENTS

| | | | |
|---|---|---|---|
| 3,909,206 A | 9/1975 | Katz | |
| 3,913,326 A | 10/1975 | Banks | |
| 3,932,987 A | 1/1976 | Munzinger | |
| 4,055,955 A | 11/1977 | Johnson | |
| 4,290,268 A * | 9/1981 | Lowther | B60K 6/08 180/165 |
| 4,341,088 A | 7/1982 | Mei et al. | |
| 4,674,463 A | 6/1987 | Duckworth et al. | |
| 4,729,879 A | 3/1988 | Black | |
| 4,786,294 A | 11/1988 | Jonqueres et al. | |
| 4,810,266 A | 3/1989 | Zinnen | |
| 4,891,939 A | 1/1990 | Brighenti | |
| 4,899,544 A | 2/1990 | Boyd | |
| 5,076,055 A * | 12/1991 | Jubb | B63G 8/12 60/279 |
| 5,100,635 A | 3/1992 | Krishnamurthy et al. | |
| 5,141,620 A | 8/1992 | Molter | |
| 5,233,837 A | 8/1993 | Callahan | |
| 5,272,891 A | 12/1993 | Erickson | |
| 5,281,254 A | 1/1994 | Birbara et al. | |
| 5,442,914 A | 8/1995 | Otsuka | |
| 5,467,722 A | 11/1995 | Meratla | |
| 5,515,691 A | 5/1996 | Wertenbach et al. | |
| 5,667,561 A | 9/1997 | Suzuki et al. | |
| 5,680,764 A | 10/1997 | Viteri | |
| 5,743,080 A | 4/1998 | Ginter | |
| 5,857,324 A | 1/1999 | Scappatura et al. | |
| 5,876,488 A | 3/1999 | Birbara et al. | |
| 6,079,373 A | 6/2000 | Kawamura | |
| 6,218,173 B1 | 4/2001 | Naito | |
| 6,220,019 B1 | 4/2001 | Sugiura et al. | |
| 6,263,659 B1 | 7/2001 | Dillon et al. | |
| 6,301,927 B1 | 10/2001 | Reddy | |
| 6,352,576 B1 | 3/2002 | Spencer et al. | |
| 6,374,630 B1 | 4/2002 | Jones | |
| 6,387,337 B1 | 5/2002 | Pennline et al. | |
| 6,582,498 B1 | 6/2003 | Sass et al. | |
| 6,591,614 B2 | 7/2003 | Smith et al. | |
| 6,598,398 B2 | 7/2003 | Viteri et al. | |
| 6,625,977 B2 | 9/2003 | Lehman | |
| 6,655,150 B1 | 12/2003 | Asen et al. | |
| 6,675,609 B2 | 1/2004 | Takeuchi et al. | |
| 6,712,879 B2 | 3/2004 | Kato et al. | |
| 6,764,530 B2 | 7/2004 | Iijima | |
| 6,866,702 B2 | 3/2005 | Mitsuda | |
| 6,889,512 B2 | 5/2005 | Ebara et al. | |
| 6,890,497 B2 | 5/2005 | Rau et al. | |
| 6,912,872 B2 | 7/2005 | Whitlock | |
| 6,925,821 B2 | 8/2005 | Sienel | |
| 7,055,333 B2 | 6/2006 | Leitch et al. | |
| 7,065,962 B2 | 6/2006 | Boncodin | |
| 7,067,456 B2 | 6/2006 | Fan et al. | |
| 7,073,348 B2 | 7/2006 | Clodic et al. | |
| 7,089,743 B2 | 8/2006 | Frutschi et al. | |
| 7,207,170 B2 | 4/2007 | Fukuma | |
| 7,250,150 B1 | 7/2007 | Keefer et al. | |
| 7,266,940 B2 * | 9/2007 | Balan et al. ............ 60/39.181 | |
| 7,275,395 B1 | 10/2007 | Ventura | |
| 7,290,504 B2 | 11/2007 | Lange | |
| 7,326,280 B2 | 2/2008 | Hrycak et al. | |
| 7,390,444 B2 | 6/2008 | Ramme et al. | |
| 7,444,812 B2 | 11/2008 | Kirkpatrick et al. | |
| 7,618,606 B2 | 11/2009 | Fan et al. | |
| 7,621,980 B2 | 11/2009 | Saito et al. | |
| 2003/0053942 A1 | 3/2003 | Fernandez | |
| 2004/0074235 A1 | 4/2004 | Lampkin et al. | |
| 2004/0128975 A1 * | 7/2004 | Viteri ............ 60/39.55 | |
| 2004/0187486 A1 | 9/2004 | Ieda | |
| 2005/0115230 A1 | 6/2005 | Shi | |
| 2005/0172631 A1 * | 8/2005 | Primlani ............ F23C 99/00 60/698 |
| 2005/0193962 A1 | 9/2005 | Mariscal Munoz | |
| 2006/0039853 A1 | 2/2006 | Fan et al. | |
| 2006/0150665 A1 | 7/2006 | Weimer et al. | |
| 2006/0204425 A1 | 9/2006 | Kamijo et al. | |
| 2007/0149398 A1 | 6/2007 | Jones et al. | |
| 2007/0193254 A1 | 8/2007 | Johannes | |
| 2007/0243127 A1 | 10/2007 | Fedorov et al. | |
| 2008/0010967 A1 * | 1/2008 | Griffin et al. ............ 60/39.182 | |
| 2008/0056972 A1 | 3/2008 | Iijima | |
| 2008/0112868 A1 | 5/2008 | Blencoe et al. | |
| 2008/0127632 A1 | 6/2008 | Finkenrath et al. | |
| 2008/0134660 A1 | 6/2008 | Finkenrath et al. | |
| 2008/0202339 A1 | 8/2008 | Nalette et al. | |
| 2008/0236117 A1 * | 10/2008 | Zhang et al. ............ 55/418 | |
| 2008/0302104 A1 | 12/2008 | Hwang | |
| 2009/0019861 A1 | 1/2009 | Heckt et al. | |
| 2009/0038561 A1 | 2/2009 | Hago et al. | |
| 2009/0169452 A1 | 7/2009 | Constantz et al. | |
| 2009/0173073 A1 | 7/2009 | Guidati et al. | |
| 2009/0178387 A1 | 7/2009 | Schultz et al. | |
| 2009/0183697 A1 | 7/2009 | Inui | |
| 2009/0263296 A1 | 10/2009 | Taques | |
| 2009/0263316 A1 | 10/2009 | Iyer et al. | |
| 2009/0275120 A1 | 11/2009 | Koch et al. | |
| 2009/0282389 A1 | 11/2009 | Slone et al. | |
| 2009/0305388 A1 | 12/2009 | Dressler et al. | |
| 2009/0313997 A1 | 12/2009 | Bayley et al. | |
| 2009/0315489 A1 | 12/2009 | Karim et al. | |
| 2010/0024651 A1 | 2/2010 | Bansal | |
| 2010/0071559 A1 * | 3/2010 | Miachon ............ B01D 53/228 96/113 |
| 2010/0158776 A1 | 6/2010 | Drnevich et al. | |
| 2010/0172810 A1 | 7/2010 | Yi et al. | |
| 2011/0167798 A1 | 7/2011 | Evans-Beauchamp | |

FOREIGN PATENT DOCUMENTS

| | | |
|---|---|---|
| DE | 4140573 A1 | 6/1993 |
| EP | 1992799 A2 | 11/2008 |
| FR | 2875265 A1 | 3/2006 |
| JP | 2006298707 A | 11/2006 |
| WO | 03/029625 A1 | 4/2003 |

OTHER PUBLICATIONS

International Search Report & Written Opinion mailed on May 21, 2012 in PCT/US2012/022008 filed Jan. 20, 2012.
Supplementary European Search Report & Opinion mailed Oct. 31, 2014 in EP 12736166 filed Jan. 21, 2012.
International Search Report & Written Opinion mailed May 25, 2012 in PCT/US2012/022058 filed Jan. 20, 2012.
Supplementary European Search Report & Opinion mailed Oct. 21, 2014 in EP12736182 filed Jan. 20, 2012.
Office Action mailed Nov. 26, 2014 in U.S. Appl. No. 13/980,453, filed Jul. 18, 2013.
International Search Report & Written Opinion mailed May 10, 2012 in PCT/US2012/022034 filed Jan. 20, 2012.
Supplementary European Search Report & Opinion mailed Jul. 23, 2014 in EP 12736347 filed Jan. 20, 2012.
Office Action mailed Oct. 3, 2014 in U.S. Appl. No. 13/980,596, filed Aug. 29, 2013.
International Search Report & Written Opinion mailed May 8, 2012 in PCT/US2012/022021 filed Jan. 20, 2012.

* cited by examiner

MEMBRANE SEPARATION METHOD AND SYSTEM UTILIZING WASTE HEAT FOR ON-BOARD RECOVERY AND STORAGE OF $CO_2$ FROM MOTOR VEHICLE INTERNAL COMBUSTION ENGINE EXHAUST GASES

FIELD OF THE INVENTION

The invention relates to the reduction of carbon dioxide emissions from the exhaust gas stream of vehicles powered by internal combustion engines and other heat engines that produce waste heat.

BACKGROUND OF THE INVENTION

The currently accepted thinking is that global warming is due to emissions of greenhouse gases such as carbon dioxide ($CO_2$) and methane ($CH_4$). About a quarter of global human-originated $CO_2$ emissions are currently estimated to come from mobile sources, i.e., automobiles, trucks, buses and trains that are powered by an internal combustion engine (ICE). This proportional contribution is likely to grow rapidly in the foreseeable future with the projected surge in automobile and truck ownership in developing countries. At present, the transportation sector is a major market for crude oil, and controlling $CO_2$ emissions is both an environmental responsibility and a desirable goal in order to maintain the viability of the crude oil market in the transportation sector in the face of challenges from alternative technologies, e.g., cars powered by electric motors and storage batteries.

Carbon dioxide management from mobile sources has many challenges including space and weight limitations, the lack of any economies of scale and the dynamic nature of the operation of the ICE powering the mobile sources.

Prior art methods for the capture of $CO_2$ from combustion gases have principally focused on stationary sources, such as power plants. Those that address the problem of reducing $CO_2$ emissions from mobile sources employ combustion using oxygen, provide no means for the regeneration and reuse of the $CO_2$ capture agent, and/or make no use of waste heat recovered from the hot source. Combustion using only oxygen requires oxygen-nitrogen separation which is more energy-intensive than separating $CO_2$ from the exhaust gases and the separation problem would be made even more difficult if attempted on board the vehicle.

The focus of $CO_2$ capture technology has been on stationary, or fixed sources. The capture of $CO_2$ from mobile sources has generally been considered too expensive, since it involves a distributed system with a inverse economy of scale. The solution to the problem has appeared to be impractical due to on-board vehicle space limitations, the additional energy and apparatus requirements and the dynamic nature of the vehicle's operating cycle, e.g., intermittent periods of rapid acceleration and deceleration.

It is therefore an object of the present invention to provide a method, system and apparatus that addresses the problems of efficiently and cost-effectively reducing the $CO_2$ emissions from vehicles by temporary on-board storage of the $CO_2$. The capability for mass production of such systems will at least partially off-set other costs associated with the distributed nature of these mobile sources.

A further object of the invention is to provide systems and methods that are adapted to capture and store essentially pure $CO_2$ that would otherwise be discharged into the atmosphere from motor vehicles, so that it can be utilized in any of the many commercial and industrial processes for which $CO_2$ is required, or sent to a permanent storage site.

As used herein, the term "internal combustion engine", or ICE, includes heat engines in which a carbon-containing fuel is burned to produce power or work and generates waste heat that must be removed or dissipated.

As used herein, the term "mobile source" means any of the wide variety of known conveyances that can be used to transport goods and/or people that are powered by one or more internal, combustion engines that produce an exhaust gas stream containing $CO_2$. This includes all types of motor vehicles that travel on land, trains and ships where the exhaust from the ICE is discharged into a containing conduit before it is discharged into the atmosphere.

The term "vehicle" as used herein is to be understood to be as a convenient shorthand and synonymous with "mobile source" and is coextensive with "conveyances", generally, as that term is used above.

As used herein, the term "waste heat" is the heat that a typical engine produces which is contained mainly in the hot exhaust gases (~300°-650° C.) and the hot coolant (~90°-120° C.). Additional heat is emitted and lost by convection and radiation from the engine block and its associated components, and other components through which the exhaust gas passes, including the manifold, pipes, catalytic converter and muffler. This heat energy totals about 60% of the energy that typical hydrocarbon (HC) fuels provide.

SUMMARY OF THE INVENTION

The above objects and other advantages are attained by the present invention which broadly comprehends a method and system for on-board treatment of an exhaust stream containing $CO_2$ emitted by a hydrocarbon-fueled internal combustion engine (ICE) used to power a vehicle in order to reduce the amount of $CO_2$ discharged into the atmosphere by selective gas permeation of $CO_2$ from the exhaust gas stream.

The process for membrane separation of $CO_2$ from the exhaust gas stream includes contacting the exhaust gases with the retentate side of the membrane under predetermined optimum conditions of temperature, pressure and flow rate for the particular type of membrane module used. The $CO_2$ permeates the membrane under a driving force and passes to the permeate side of the membrane where it is collected.

The substantially pure $CO_2$ gas is recovered from the permeate side of the membrane and passed to the intake of a compressor for the densification step to compress the gas and to form liquid and/or solid $CO_2$. Thereafter, the densified $CO_2$ is maintained in storage on board the vehicle until it can be removed at a vehicle fueling facility, or other appropriate receiving station.

A pressure differential across the membrane can provide the driving force that causes the $CO_2$ to permeate the membrane. It can be a vacuum on the permeate side or the higher pressure of the exhaust gas stream feed on the retentate side. For example, membrane modules such as aromatic polyamide hollow fibers can operate at a relatively high pressure differential. In addition to $CO_2$, $H_2O$ and $H_2S$ (if present), will also permeate this type of membrane.

Since compression is energetically demanding, one or more of the following measures can be utilized to reduce the compression energy required to densify the $CO_2$ recovered from the exhaust gas stream.

1. The hot exhaust gas stream can be introduced into a turbocharger, thereby using some of the kinetic energy of the moving exhaust gas stream to pressurize the gases.
2. Heat energy can be recovered from the exhaust gas stream which is initially at a temperature in the range of 300° C. to 650° C., and converted into mechanical energy and/or electrical energy that is used to compress the exhaust gases.

3. A predetermined portion of the exhaust gas stream is compressed and introduced into the membrane module.

The principal components of the system and apparatus of the invention are the membrane module, vacuum pump, turbocharger, and/or compressor, heat recovery devices and means for densification. The function of the membrane module is to selectively separate $CO_2$ from the exhaust gas. Suitable membrane modules for use in the invention can be selected from one or a combination of the following:

a. hollow fiber membrane units;
b. spiral wound membrane module units; and
c. flat sheet membranes.

The membranes can be constructed of the following materials:

a. nonporous polymers that selectively permeate $CO_2$, including such materials as cellulose, acetate, polyimides, polyamides, polysulfone, polycarbonates and polyetherimide;
b. homogeneous membranes;
c. composites formed of a porous support layer and an extremely thin nonporous layer of a selective $CO_2$ permeable material;
d. liquid supported membranes in which the liquid is selected to preferentially permeate $CO_2$;
e. facilitate transport membranes; and
f. ceramic membranes.

A presently preferred membrane material for use with gasoline exhaust streams is polymeric, since it is relatively less expensive, has high permeability and there are a variety of materials from which to choose. For separating $CO_2$ from diesel exhausts which typically contain unburned oxygen due to the use of a lean fuel mixture having excess oxygen, the presence of which can degrade polymers over time, the preferred membrane materials are ceramics and the more expensive polymers that are formulated to resist oxygen degradation.

In an alternative embodiment, the membrane can be a nonporous polymer that selectively permeates nitrogen. In this embodiment, the $N_2$ permeate is discharged into the atmosphere and the $CO_2$ retentate is subjected to densification and storage as described above.

The flow rate of the exhaust gas to the membrane module(s) can be adjusted based on the level of the detected $CO_2$ concentration in the exhaust gas outlet, a specified empirically determined operating time, or other means to ensure full utilization of the capacity of the membrane module(s). In one mode of operation, the conditions of pressure, temperature and flow rate of the exhaust gases are maintained at predetermined levels to optimize permeation of the $CO_2$ and any excess exhaust gases are diverted from the membrane and discharged to the atmosphere untreated.

The method and system can include:
a. a first waste heat recovery zone on board the vehicle for receiving the high temperature exhaust gas stream,
  at least one heat exchanger having an inlet for receiving the hot exhaust gas stream from the ICE for passage in heat exchange relation and a discharge outlet for discharging the exhaust stream at a lower temperature,
  the heat recovery zone further including at least one heat recovery device for converting the waste heat from the exhaust gas stream to electrical and/or mechanical energy;
b. a membrane separation zone in fluid communication with the exhaust gas stream discharge outlet of the waste heat recovery zone, the membrane separation zone including a membrane module having at least one membrane with a permeate side to which $CO_2$ permeates, the permeate side having a $CO_2$ discharge outlet, and a retentate side that is contacted by the cooled exhaust gas stream, the retentate side including a treated exhaust gas stream outlet;
c. a densification zone in fluid communication with the permeate side of the membrane module for receiving permeate $CO_2$, the densification zone including means for reducing the temperature and volume of the $CO_2$ to at least liquefy the $CO_2$, and to produce a treated exhaust gas stream of reduced $CO_2$ content;
d. a storage zone for receiving the densified $CO_2$ for temporary storage on board the vehicle; and
e. an exhaust gas conduit in fluid communication with the treated exhaust gas stream outlet from the membrane module zone.

In one embodiment, the $CO_2$ permeation driving force for the membrane module is provided by pressurizing the exhaust gas prior to its contact with the membrane, e.g., by use of a compressor, a turbocharger or other known means. In another embodiment, a vacuum pump in fluid communication with the permeate side of the membrane creates a zone of low pressure and a corresponding pressure differential across the membrane. In another embodiment, a carrier fluid such as steam is admitted to the membrane module and sweeps past the permeate side of the membrane to carry $CO_2$ away and maintain the $CO_2$ partial pressure difference across the membrane, thereby eliminating the need for a vacuum on the permeate side or pressure on the retentate side. The steam for the sweep can be provided by passing water in heat exchange with the hot exhaust gas stream, e.g., in a small shell and tube steam boiler, and conducting the steam into the permeate side of the membrane module. The $CO_2$ and steam/water discharged from the module is passed to a cooler/separator and the $CO_2$ is withdrawn for densification; the water can be discharged to the atmosphere or recycled to the steam-generating heat exchanger. The water used in this embodiment can be extracted from the exhaust gas stream as part of the exhaust gas cooling and $CO_2$ capture process or drawn from a separate reservoir. A combination of the driving forces described above can also be used.

The invention provides a method and system for the separation of substantially pure $CO_2$ from the engine exhaust gases, followed by its densification and temporary storage of the densified $CO_2$ on board the vehicle for later use in any of a wide variety of known commercial and industrial uses. All or part of the energy requirements for the separation and densification steps are derived from the engine's waste heat, which can include the exhaust gas stream, the engine's cooling system, and the engine block and associated metal components. The environmental advantages of the invention are apparent.

The method and system of the invention integrate various components for efficient post-combustion $CO_2$ separation by selective gas permeation, densification and temporary on-board storage using waste heat generated by the combustion of the hydrocarbon fuel used to power the vehicle. As noted above and with reference to the diagram of FIG. 1, the total waste heat that a typical internal combustion engine produces is about 60% of the energy that typical hydrocarbon (HC) fuels provide. This energy is contained mainly in the hot exhaust gases (~300°-650° C.) and the hot coolant (~90°-120° C.). Additional heat is also emitted and lost by convection and radiation from the engine block and its associated components, and other components through which the exhaust gas passes, including the manifold, pipes, catalytic converter and muffler.

Energy is needed to separate the $CO_2$ from the exhaust gases and to compress and liquify or freeze all or part of the $CO_2$ recovered from the membrane module for efficient on-board storage. The work component of the energy is generated by using part of the waste heat to produce the work.

During startup of the $CO_2$ separation and densification cycles, or for a special need, part of the engine power, or the electricity stored in on-board batteries can be used to provide all or a portion of the work/energy requirements. During normal operations, at least a portion of the energy required for separation and densification comes from the waste heat.

The $CO_2$ separation from the exhaust gases is effected by membrane separation of the gaseous $CO_2$ from the gaseous nitrogen and other combustion products. The densification of $CO_2$ for efficient temporary on-board storage is accomplished by compression of the gas, liquefaction and/or freezing, e.g., to form dry ice, with a final density in the range of 5-1600 kg/m3. At ambient temperatures, $CO_2$ can exist as a liquid. The critical point of $CO_2$ is 31° C. and 73 bar. The freezing point of the liquid to form the solid dry ice is −78° C. Thus, freezing requires a much greater temperature reduction, but the density is high at about 1.4 to 1.6 g/cm3, thereby reducing the space required to store $CO_2$ on board until refueling and/or delivery to an appropriate receiving facility.

The presently preferred operating conditions are at a temperature in the range of from about 50° C. to 200° C. The pressure gradient will vary with the type of membrane and/or membrane module or system. The pressure gradient imposed is that which will sustain the maximum $CO_2$ flux over prolonged periods of continuous operation of the vehicle. These operating conditions allow a wide choice of membrane materials, permit heat energy to be recovered from the exhaust gas stream that can be converted to the work and/or electrical energy that is required to separate and densify the $CO_2$, and permit the use of heat exchange devices of a size and mass that are practical for installation and operation on board the mobile source.

Methods for effecting this phase change are known in the field. Part of or all of the work energy required for the densification step and the maintenance of the liquefied and/or solidified $CO_2$ is derived from the heat normally lost to the atmosphere by using heat-to-power conversion devices that are selected on the basis of the specific requirements of the system and operating environment. Internal cooling can be achieved relatively easily by heat exchange with the high temperature of the exhaust gas. The choice of the specific commercially available apparatus for use in the limited volume available on board mobile sources requires the analysis of various interrelated factors which are well within the capabilities of one of ordinary skill in the art.

The energy requirements for refrigeration can be derived from the processes that are described below.

1. A compression refrigeration cycle in which the mechanical energy needed for compression is obtained from a heat recovery unit that converts waste heat into electricity or mechanical work. In addition, some of the mechanical energy is recovered by expanding the low-$CO_2$ exhaust gas that is discharged into the atmosphere.
2. The waste heat is supplied directly to an adsorption refrigeration cycle which cycle has no moving parts and, therefore, does not drain any of the work from the engine's power train.
3. The use of subsonic or supersonic nozzles for rapid expansion and cooling of the permeate gas that will result in the precipitation of the $CO_2$ in liquid or gas form for collection and temporary on board storage.

Partial compression can be achieved by passing the exhaust gas through a turbocharger, thus recovering some of the flow energy of the exhaust gas stream.

The present invention solves the problems of space limitations and auxiliary power requirements by using the free energy in the waste heat that is available on board the vehicle to separate and densify at least a portion of the $CO_2$ in the exhaust gas stream to thereby significantly reduce its volume for temporary storage until it can be recovered at a refueling or other appropriate facility. The invention includes (a) a cooling and membrane separation method to remove all or a substantial portion of the $CO_2$ from at least a portion of the engine exhaust gas stream; (b) the recovery of substantially pure $CO_2$ using some of the engine waste heat; (c) conversion of some of the engine's waste heat into electrical and/or mechanical power, i.e., work energy; and (d) the use of this power to create a pressure differential across the membrane for separation and to increase the density of the $CO_2$ for temporary on-board storage. The use of the waste heat to provide the energy for separation and densification simplifies the process of separating the $CO_2$ from the combustion products in the exhaust gas stream, significantly reduces the cost, and the densification reduces the volume requirement for temporary on-board storage of the $CO_2$.

The invention further comprehends the optional use of some portion of the engine's work to operate one or more $CO_2$ compressors. The engine's work can be utilized when the engine is operating in the deceleration mode and would serve to slow the engine, and when the engine is idling. An on-board processor and controller can be utilized to engage the compressor drive link to the engine at appropriate predetermined engine operating conditions.

The invention can be used on a wide range of mobile sources such as passenger vehicles, trucks, buses, heavy-duty vehicles, train, ships, planes and the like that operate through the combustion of fossil-based, or hydrocarbon fuels. The system and apparatus of the invention can be installed on new mobile sources and/or by retrofitting existing mobile sources.

The present invention is based on the integration of various components to form a system for efficient post-combustion $CO_2$ separation from the majority of other exhaust gases, its densification and subsequent temporary storage on board the conveyance using waste heat recovered from the vehicle's ICE. The system can include (a) a first heat exchange zone to recover a portion of the waste heat and associated energy and to thereby reduce the temperature of the $CO_2$ and other constituents in the engine's exhaust gas stream; (b) a membrane separation zone for the separation of $CO_2$ from the exhaust gas stream that uses some of the engine waste heat to create a differential pressure; (c) an energy conversion zone where some of the waste heat is converted into electrical and/or mechanical power (work energy); (d) a densification zone where power derived from the waste heat is employed to increase the density of the $CO_2$; and (e) optionally, an insulated cooled storage zone for the temporary on-board storage of the densified $CO_2$ in the form of a liquid or solid. Separate storage areas will be required since solid $CO_2$ sublimates to the gaseous form. In the practice of the method of the invention, all or a substantial portion of the energy requirements to operate the system come from the engine's waste heat.

During start-up of the $CO_2$ capture cycle, or to meet a requirement of other special operational needs, part of the engine's power or, alternatively, the electricity stored in on-board batteries can be used. During the normal steady-state operation of the system, at least a portion of the energy required for $CO_2$ separation and densification will come from the ICE's waste heat.

One advantage possessed by the present invention over prior art processes for reducing $CO_2$ emissions from fixed sources is the ready availability of relatively high to moderate temperature waste heat. The cost of the heat energy is a major item of expense for $CO_2$ capture from fixed sources because the temperature of the flue gases from a coal- or gas-fired electrical generation facility is greatly reduced in order to maximize the energy values of the fuel and minimize the discharge of pollutants such as $SO_x$ and waste heat into the environment.

BRIEF DESCRIPTION OF THE DRAWINGS

The invention will be further described below and with reference to the attached drawings in which the same or similar elements are identified by the same number, and in which.

DETAILED DESCRIPTION OF THE INVENTION

Figure 1:
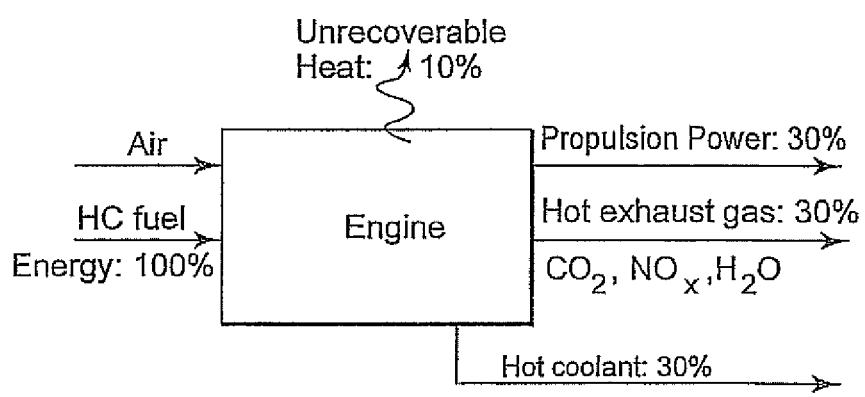
FIG. 1 is a schematic illustration of the conversion of hydrocarbon fuel energy to heat and power by a typical internal combustion engine as determined in the prior art.
Figure 2:
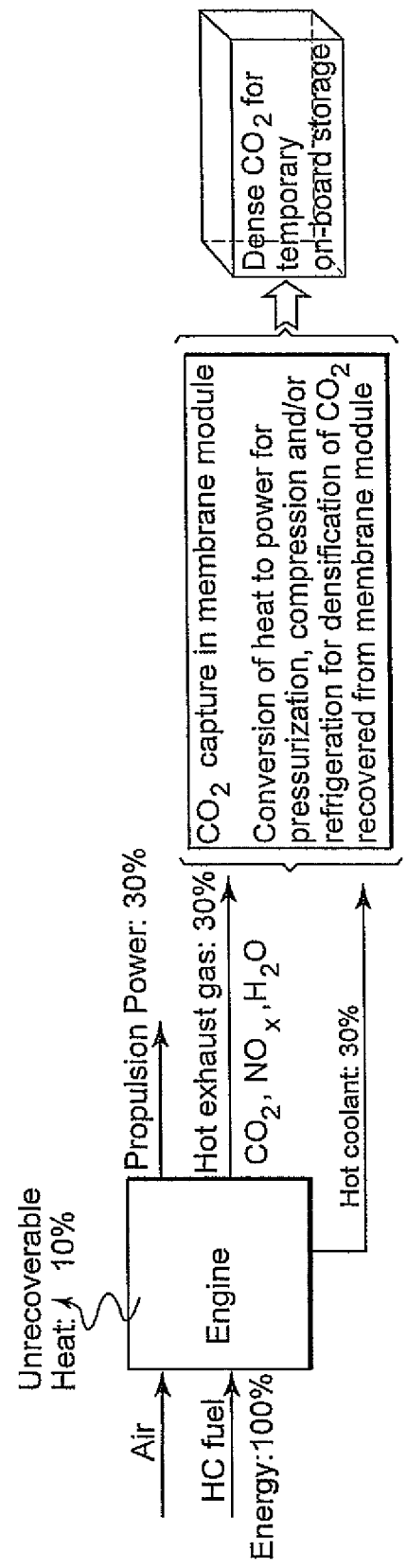
FIG. 2 is a schematic diagram that incorporates FIG. 1 and illustrates the method of the present invention.

Reference is made to the schematic illustration of FIG. 2 which provides an overview of the direct densification method of the invention for the selective gas permeation and separation of the $CO_2$ from the exhaust gas stream in which waste heat energy from the fuel's combustion is converted to other forms of energy to effect the separation and densification.

Figure 3:
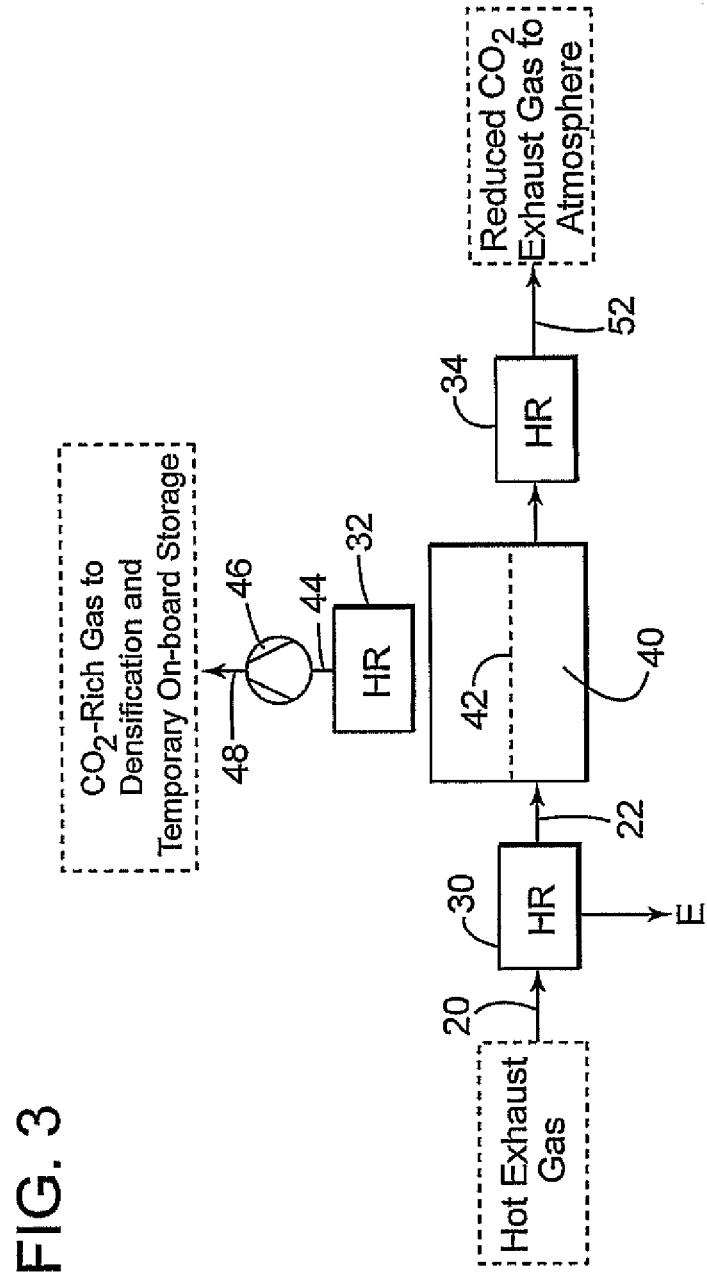
FIG. 3 is a schematic illustration of an embodiment of the present invention utilizing pressure reduction downstream of the membrane to enhance $CO_2$ permeation.
Figure 4:
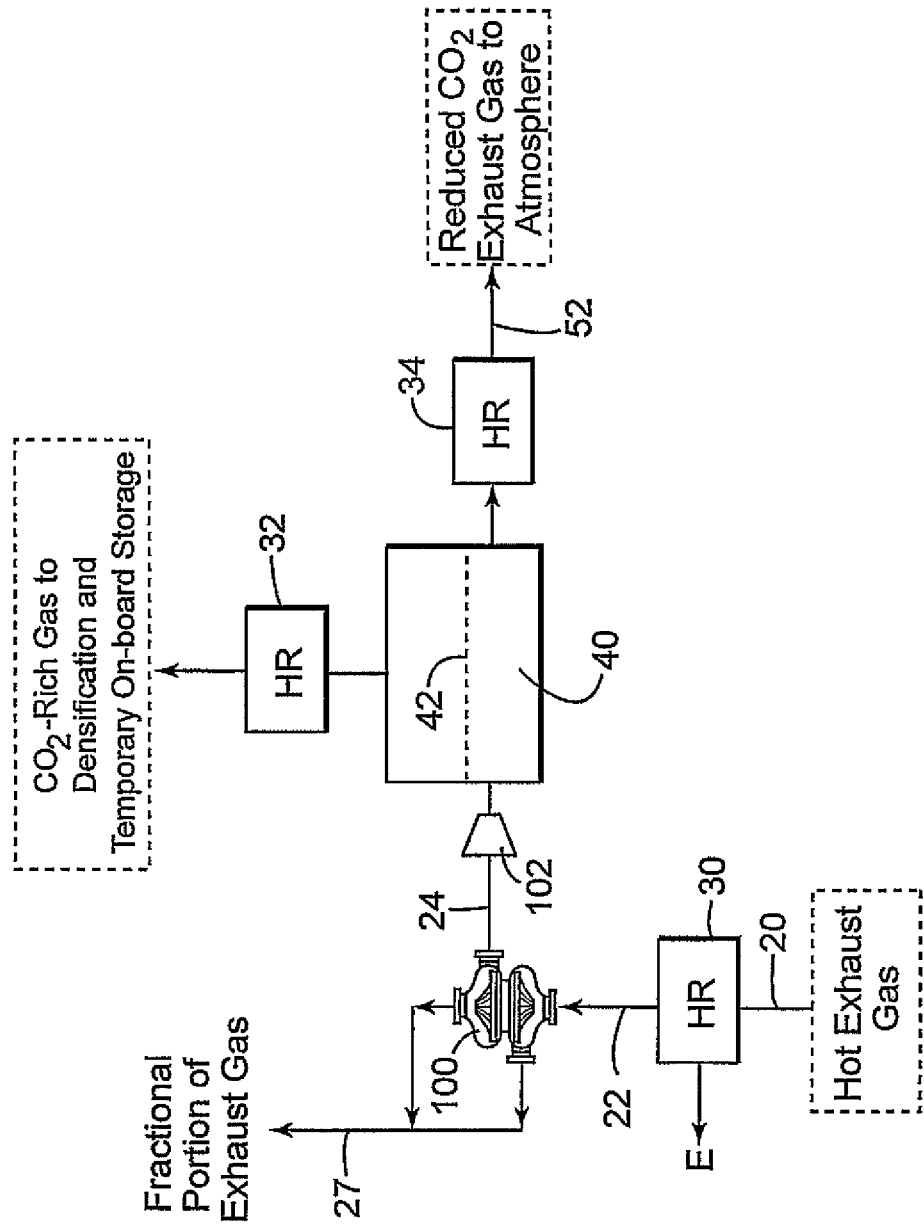
FIG. 4 is a schematic illustration of an embodiment of the present invention utilizing increased pressure upstream of the membrane to enhance permeation.
Figure 5:
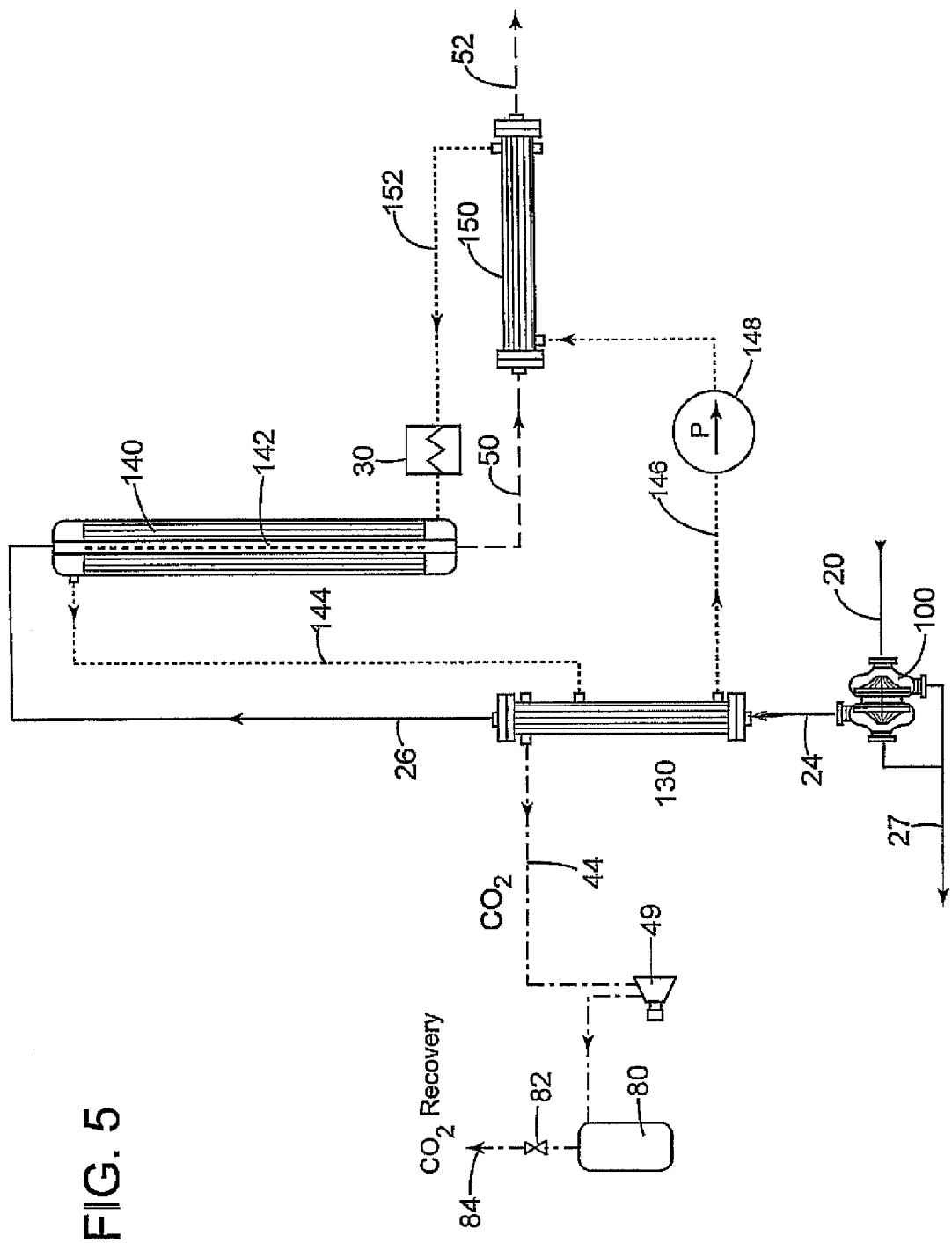
FIG. 5 is a schematic illustration of an embodiment of the present invention that utilizes a liquid absorbent.

Several representative embodiments of this invention are shown in FIGS. 3, 4 and 5. Referring first to FIG. 3, which illustrates a vacuum-driven process, the hot exhaust gas stream 20 passes through a first heat recovery (HR) unit 30 that operates at temperatures of 300° C. to 650° C. to convert some of the waste heat into electrical or mechanical energy represented by "E".

The cooled exhaust gas stream 22 is then introduced into the membrane module 40 that contains one or more membranes 42. The permeate side of the membrane 42 is at a relatively lower pressure due to the partial vacuum created by vacuum pump 46. The pressure differential across the membrane 42 provides the driving force needed to enhance the $CO_2$ flux, or flow through the membrane to the permeate side. The $CO_2$ gas stream 44 and any water vapor and/or other permeate gases are passed through HR unit 32 to further reduce the temperature of the gases before passing to the densification step. The water vapor condenses and is removed during the cooling of the $CO_2$. If present, other gases, e.g., $NO_x$, $SO_x$ and hydrocarbon vapors can be removed by any of various known treatments (not shown). The compressed, liquefied and/or solid $CO_2$ is maintained in temporary on-board storage. The retentate gases 52 are optionally passed through HR 34 and discharged to the atmosphere.

FIG. 4 illustrates a compression-driven process. The hot exhaust gas stream passes through a first heat recovery unit HR 30 that operates at temperatures of 300° C. to 650° C. to convert some of the waste heat into electrical or mechanical energy "E". The cooler exhaust gas stream 22 passes to a turbocharger 100 to increase its pressure and also to divide the exhaust gas stream, so that a portion 24 is subjected to $CO_2$ membrane separation and capture and the remainder 27 is discharged into the atmosphere. This volumetric split can be based on the exhaust gas stream 22 flow rate in relation to the combined energy available for $CO_2$ capture and densification. If the turbocharger 100 does not produce sufficient pressure to drive the membrane module at optimum conditions, the fractional exhaust gas stream 24 can be further pressurized by an optional compressor 102.

The pressurized exhaust gas 24 is then introduced into the membrane module 40. The permeate side of the membrane 42 is at a relatively lower pressure created by the suction side of the fan/compressor of the densification unit. The pressure differential provides the driving force that causes the $CO_2$ to pass through the membrane 42 to the permeate side. The $CO_2$ and any water vapor and/or other permeate gases are passed to the densification step. The compressed, liquefied and/or solid $CO_2$ is maintained in temporary on-board storage. The retentate gases 52 are optionally passed through HR unit 34 and discharged to the atmosphere.

From the above description of the process of FIGS. 3 and 4, it will be apparent that the exhaust gas stream 20 can optionally also be introduced into a turbocharger to partially increase its pressure and also to split the exhaust gas stream, so that a portion is subjected to efficient $CO_2$ removal in the membrane module 40 and the remainder 27 is discharged directly into the atmosphere. This volumetric split can be based on the exhaust gas stream flow rate in relation to the energy available for $CO_2$ capture and densification. If the optional turbocharger is in use, the pressure of the exhaust gas stream entering the membrane module will be increased, thereby increasing the differential pressure created by the vacuum pump 46.

Referring now to the system and apparatus schematically illustrated in FIG. 5, a so-called hybrid method will be described. The hot exhaust gas stream 20 is optionally pressurized by a modified turbocharger 100 and passed in heat exchange relation with a $CO_2$-rich liquid absorbent in a $CO_2$ recovery zone 130 for the purpose of releasing the $CO_2$ from the liquid absorbent. The cooler pressurized $CO_2$-rich exhaust gas stream 26 is passed to the retentate side of the membrane separation module 140 and the $CO_2$ permeates the membrane 142 and is absorbed by cooled liquid absorbent 144. The $CO_2$-lean engine exhaust stream 50 that is the retentate is passed from the membrane separation module 140 and is optionally passed in heat exchange relation with the $CO_2$-lean absorbent in heat exchanger 150 prior to being discharged as the $CO_2$-lean exhaust gas stream 52 to the atmosphere. Alternatively, the absorbent can be passed to an ambient air cooler or a heat recovery unit 30 to reduce its temperature.

The $CO_2$ stream 44 desorbed from the absorbent by heat exchange in unit 30 as described above is compressed by compressor 49 and accumulated in a pressure vessel 80 for temporary storage until it is removed from the mobile source. The heated $CO_2$-lean liquid absorbent 146 is circulated by pump 148 in heat exchange relation with ambient air, a heat recovery unit or the $CO_2$-lean engine exhaust stream in cooler 150, as described above, before its return to the membrane separation module 140.

The size or capacity, location and operating conditions of the HR devices are determined based upon the availability of waste heat, e.g., from the engine exhaust gas stream. This will include both temperature and the volumetric flow rate of the waste heat stream, whether it be the exhaust gas stream or the engine coolant. A single or more than one type of heat recovery device can be employed depending upon the nature of the waste heat stream and its temperature and flow conditions. The selection and rating of the HR devices is within the capabilities of one of ordinary skill in the art.

The operation of the heat/energy recovery system can be controlled by a pre-programmed processor and controller that receives data from temperature and flow sensors, and that is in controlling communication with flow-regulating valves. For example, in the embodiment described in connection with FIG. 5 in which a liquid absorbent is employed on the permeate side of the membrane, the temperature of the engine exhaust gas stream can be reduced by passing it in heat exchange relation with the liquid absorbent material in order to raise its temperature sufficiently to desorb the $CO_2$. The cooler exhaust gas stream having a lower temperature can then optionally exchange further heat with a thermoelectric device (not shown) to produce electricity. Finally, the exhaust gas of relatively lower temperature can be introduced into the membrane separation module where the $CO_2$ permeates the membrane and is absorbed by the liquid absorbent.

The exhaust gas stream from a gasoline or diesel fueled ICE contains about 13% water vapor. The water vapor will condense to form a liquid during the early stages of the densification process and can be removed from the process by methods and apparatus that are well known in the art. The water can be discharged into the atmosphere in liquid form, or passed into contact with a hot surface to convert it back into vapor form for discharge alone or with the treated low $CO_2$-content exhaust gas stream. In any event, substantially all of the water vapor will be discharged into the atmosphere with the nitrogen and any remaining $CO_2$.

It is preferable that the $CO_2$ be removed from the exhaust gas stream downstream of the catalytic converter on vehicles that are so equipped in order to reduce the contaminants that could adversely effect the membrane and/or the densification process. In addition, when the engine is cold at start-up, the exhaust gas downstream of the catalytic converter will be hotter than upstream due to the exothermic reactions that occur in the converter.

Existing membranes, modules and related systems are known for the treatment of natural gas to effect the separation of $CO_2$, water vapor and $H_2S$ as the permeate. In a preferred embodiment, any $H_2S$ and/or $NH_3$ that might be formed in the catalytic converter used to treat the exhaust gas stream is oxidized to other compounds that will not pass through the membrane. This conversion can be accomplished, for example, by contacting the exhaust gas stream with nickel, and/or manganese compounds at a location upstream of the membrane, e.g., in a converter that contains these compounds.

Small amounts of $SO_x$ and $NO_x$ that can also be present in the exhaust gas stream from various engines can be removed or reduced to a predetermined level by contact with a solid adsorbent, or by other known methods that are currently employed in various types of emission control devices. As will be understood by those of ordinary skill in the art, many types of membranes are able to efficiently operate with concentrations at the level of parts per million (ppm) of these and other contaminants that can be present in an ICE exhaust gas stream.

The $CO_2$ densification component can be accomplished by a single or multiple stage compressor with an appropriate active/passive cooling system to ensure pressurization and liquification or solidification of $CO_2$ for its temporary on-board storage. The $CO_2$ storage can be in a single tank or in multiple tanks on board the mobile source. The fuel tank can also be used to store the densified $CO_2$ by having a moving partition, e.g., a flexible bladder, between the fuel side and the $CO_2$ storage side.

Heat management and control is required to assume the efficient operation of the system. Heat will have to be removed from the hot exhaust gases by the heat recovery devices. Heat will have to be supplied to other component(s) to provide the required heat for electrical generation or work. Supply and removal of heat can be accomplished using different methods including conduction, convection, radiation and/or a combination of these methods. Control of all of the system components can be integrated with the mobile source's engine management unit or engine control system, or by a separate $CO_2$ separation control and management system to optimize performance.

In the case of conduction, heat can be supplied or removed using a thermal conducting material, such as metal. If the exhaust gases are passed through tubes, the heat can be removed from the outside of the tubes using conduction through the tube shell. Fluids can be used to supply or remove the heat from the outer shell of the tubes. Fins, metal mesh inside the tubes and other designs and known techniques can be used to increase the surface area in contact with the hot gases and enhance the heat transfer. Fins and other surface changes can also be used on the outer shell of the tube to enhance the heat transfer of the system. The $CO_2$ exhaust gases can also be passed over the outside of tubes and the inside of the tube used to supply or remove the heat transfer fluids.

FIGS. 3 and 4 identify suitable locations for placement of HR components. These schematic illustrations are to be understood to represent non-limiting examples. Single or multiple technologies can be used to convert the waste heat to electrical energy or work to compress the $CO_2$ and power the auxiliary equipment.

The type of heat recovery (HR) component(s) used in the practice of the invention can include, but are not limited to the following types of apparatus.

1. Thermoelectric devices used to convert the waste heat to electrical energy can be placed in different locations and arrangements to optimize the energy conversion. The thermoelectric devices can be secured in heat conductive contact with the exhaust pipe, capture components, engine block or other engine components as the hot side of the device. The cold side of the thermoelectric device can be exposed to air convection to cool the device. The cold side of the thermoelectric device can also be in contact with an active cooling system, e.g., a circulating liquid, to facilitate heat transfer and also control the thermoelectric module's performance.

The hot side of the thermoelectric module is installed on the exhaust gas side and the cold side is installed in a closed cooling system referred to as an (active system) or exposed to air (a passive system). The thermoelectric module(s) remove part of the heat from the hot side and generate electrical power that can be used to operate the densification apparatus and/or other on board equipment.

The thermoelectric devices can assume different shapes such as cylindrical or rectangular pipes to minimize the pressure drop effects on the exhaust gases. Internal and/or external fins can also be used to enhance the heat transfer of the thermoelectric devices and hence their performance. Thermoelectric device could be mounted very close to, or on the engine block to make use of the high temperatures. Appropriate materials are selected to withstand the high temperatures.

2. Electrical power generated using thermoelectric module(s) can be supplied to an electrical storage system, e.g. batteries, which in turn supply the electrical power to the densification apparatus and/or other equipment.

Selection of the semiconductors for the thermoelectric module(s) is based upon the temperature range of the application. Stacking of different thermoelectric devices can be used to optimize the heat recovery and hence the electrical energy generation.

3. A Stirling engine in which the waste heat from the ICE exhaust is supplied to the wall of one or more cylinders of the engine to expand the gas in the cylinder to thereby drive a piston that can perform the necessary mechanical work to run the densification compressor or to run the compressor of a compression refrigeration cycle unit that provides cold refrigerant to liquefy or solidify the $CO_2$.

4. A steam generator that provides steam to a turbine which generates mechanical work to run the densification compressor or to run the compressor of a compression refrigeration cycle unit that provides cold refrigerant to liquefy or solidify the $CO_2$.

5. A small shape memory alloy engine or compressor, utilizes the waste heat to change the shape of an alloy (such as CuSn, InTi, TiNi, and MnCu) and generates mechanical work that is used to increase the density of the captured $CO_2$. The engine compressor works by having a hot side and a cool side of the alloy to generate the compression needed. The following patents describe heat engines based on these types of unusual alloys: U.S. Pat. Nos. 3,913,326; 4,055,955; 5,442,914; 7,444,812; and published application 2009/0315489. The disclosures of these patent documents are incorporated herein by reference.

6. Single or multiple heat recovery systems can be installed on the exhaust gas and coolant systems.

7. Single or multiple heat recovery systems can be installed to generate the required power and effectively reduce the temperature of the exhaust gases and thereby reduce the downstream energy required to liquefy and/or solidify the $CO_2$.

In a further embodiment of the present invention, a portion of the $CO_2$ that is recovered after regeneration of the capture agent is returned via a suitable conduit to the air intake of the engine to be mixed with the atmospheric air and fuel. This aspect of the system operation is similar to the known methods for exhaust gas recirculation (EGR) that is currently used to reduce engine operating temperatures and thereby to reduce the amount of $NO_x$ compounds produced during the burning of the fuel. An amount of $CO_2$ equivalent to from 5 to 15 percent of the exhaust gas volume can be returned to the intake. Return of the $CO_2$ also reduces the amount of atmospheric nitrogen drawn in with the fuel mixture, which also has the beneficial effect of reducing the $NO_x$ compounds in the exhaust. The percent of $CO_2$ in the exhaust gas stream is also increased.

Recirculation of $CO_2$ can be implemented by the same devices and control systems conventionally employed for exhaust gas recirculation on motor vehicles. The recirculation of $CO_2$ can also be undertaken in conjunction with existing EGR systems. The $CO_2$ can replace all or a predetermined portion of the exhaust gas based upon the engine operating conditions or, in accordance with current practices, discontinuing recirculation entirely such as at start-up when the engine is cold, or during rapid acceleration and/or when the ICE is under a heavy load.

In a further embodiment of the invention, a portion of the $CO_2$ recovered from the membrane module is mixed with water and catalytically reacted using known methods to form methane and water by the interim reaction of hydrogen and carbon monoxide that are formed in situ. The methane and water are then used to supplement the conventional hydrocarbon fuel supplied to the engine intake. The water reacted with the $CO_2$ can be recovered from the exhaust gas stream or from a separate on-board source provided for that purpose.

The present invention addresses post-combustion $CO_2$ capture and on-board storage from mobile sources. To minimize operational cost and equipment requirements, the available heat, which is conventionally discharged into the atmosphere, is used to the maximum amount practical to provide the energy needed to separate the $CO_2$ from the combustion gases by compression to liquefy and/or solidify all or part of the produced $CO_2$ for efficient on-board storage. The $CO_2$ that is captured can be stored on board until refueling, when it can be discharged or removed for recovery at the fueling station. The apparatus of the invention is easier to deploy on board as compared to methods that have been proposed that involve chemical reactions, such as reforming, or major changes in engine design.

Although various embodiments of the invention have been described above and in the attached drawings, other modifications and variations will be apparent to those of ordinary skill in the art from this description, and the scope of the invention is to be determined by the claims that follow.

The invention claimed is:

1. A method for reducing the amount of $CO_2$ discharged into the atmosphere with the exhaust gas stream emitted by a hydrocarbon-fueled internal combustion engine (ICE) used to power a vehicle, the method comprising:
  a. passing the hot exhaust gas stream from the ICE to a first waste heat recovery zone on board the vehicle and contacting the high temperature exhaust gas stream with at least one heat exchanger having an inlet for receiving the hot exhaust gas stream from the ICE for passage in heat exchange relation and a discharge outlet for discharging a cooled exhaust stream at a lower temperature, the waste heat recovery zone further including at least one heat recovery device for converting the waste heat in the exhaust gas stream to at least one of electrical and mechanical energy;
  b. passing the cooled exhaust gas stream to a membrane separation zone that is in fluid communication with the exhaust gas stream discharge outlet of the waste heat recovery zone and in contact with at least one membrane module having a membrane with a permeate side to which $CO_2$ permeates, the permeate side having a $CO_2$ discharge outlet, and a retentate side that is in contact with the cooled exhaust gas stream, the retentate side including a treated exhaust gas stream outlet;
  c. passing the $CO_2$ from the permeate side of the membrane module to a densification zone and using the electrical and/or mechanical energy converted by the heat recovery device in step (a) to reduce the temperature and volume of the $CO_2$;
  d. transferring the densified $CO_2$ to a storage zone for temporary storage on board the vehicle; and e. passing the treated exhaust gas stream having a reduced $CO_2$ content to an exhaust gas conduit that is in fluid communication with the treated exhaust gas stream outlet of the membrane module and discharging the treated stream into the atmosphere.

2. The method of claim 1 which operates continuously following start-up of the vehicle's ICE.

3. The method of claim 1 which includes utilizing a portion of the electrical and/or mechanical energy converted by the heat recovery device in step (a) to create a pressure differential across the $CO_2$ separation membrane.

4. The method of claim 1 which includes passing the exhaust gas stream through a turbocharger to increase the pressure of at least a portion of the exhaust gas stream.

5. The method of claim 4 which includes passing the exhaust gas stream through a second waste heat recovery zone downstream of the turbocharger to reduce the temperature of the exhaust gas stream before it is introduced into the membrane module, where the second waste heat recovery zone includes a heat recovery device for converting heat in the exhaust gas stream to electrical and/or mechanical energy.

6. The method of claim 1 in which the $CO_2$ content of the exhaust gas stream is reduced by at least 10%.

7. A system for on-board treatment of an exhaust gas stream containing $CO_2$ emitted by a hydrocarbon-fueled internal combustion engine (ICE) used to power a vehicle in order to reduce the amount of $CO_2$ discharged into the atmosphere, the system comprising:
   a. a first waste heat recovery zone on board the vehicle for receiving the high temperature exhaust gas stream in heat exchange relation and discharging the exhaust stream at a lower temperature,
      the first waste heat recovery zone including at least one heat exchanger with an inlet for receiving the hot exhaust gas stream from the ICE for passage in heat exchange relation and an outlet for the cooled exhaust gas stream,
      the first waste heat recovery zone further including at least one heat recovery device operating in conjunction with the at least one heat exchanger for converting waste heat from the exhaust gas to at least one of electrical and mechanical energy;
   b. a membrane separation zone in fluid communication with the exhaust gas stream discharge outlet from the waste heat recovery zone, the membrane separation zone including a membrane module having a permeate side to which $CO_2$ permeates and a retentate side that is contacted by the cooled exhaust gas stream, the retentate side including a treated exhaust gas stream outlet;
   c. a densification zone in fluid communication with the permeate side of the membrane module for receiving permeate $CO_2$, the densification zone including densification means for reducing the temperature and volume of the $CO_2$ to at least liquefy the $CO_2$, and to produce a treated exhaust gas stream of reduced $CO_2$ content, the densification means being configured to utilize the electrical and/or mechanical energy converted by the heat recovery device in step (a);
   d. a storage zone for receiving the densified $CO_2$ for temporary storage on board the vehicle; and
   e. an exhaust gas conduit in fluid communication with the treated exhaust gas stream outlet from the membrane module zone.

8. The system of claim 7 which includes a diverter valve for regulating the volumetric amount of the exhaust gas stream which is passed to the membrane module for separation of $CO_2$.

9. The system of claim 8 in which the diverter valve is controlled based on the operating conditions of the ICE.

10. The system of claim 8 in which the diverter valve is controlled based upon the capacity crf the densification means in the densification zone to at least liquefy the $CO_2$.

11. The system of claim 8 which includes control means for discharging all or a portion of the exhaust gas stream into the atmosphere without passing through the first waste heat recovery zone or the membrane module.

12. The system of claim 7 which includes a turbocharger for increasing the pressure of the exhaust gas stream entering the membrane module.

13. The system of claim 7 which includes a low pressure inlet for $CO_2$ in fluid communication with the permeate side of the membrane module.

14. The method of claim 1 which includes passing a portion of the $CO_2$ recovered from the permeate side of the membrane module for intake by the ICE.

15. The method of claim 1 in which at least a portion of at least one of the electrical and/or mechanical energy produced by the heat recovery device is used to power auxiliary electrical and/or mechanical systems on hoard the vehicle.

16. The method of claim 1 in which a portion of the $CO_2$ recovered from the permeate side of the membrane module is utilized as a refrigerant gas in an air conditioning apparatus on board the vehicle.

* * * * *